United States Patent
Keum

(10) Patent No.: US 11,677,106 B2
(45) Date of Patent: Jun. 13, 2023

(54) BATTERY PACK HAVING BIDIRECTIONAL COOLING STRUCTURE

(71) Applicant: LG CHEM, LTD., Seoul (KR)

(72) Inventor: Jong Yoon Keum, Chungcheongbuk-do (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

(21) Appl. No.: 16/755,377

(22) PCT Filed: Oct. 5, 2018

(86) PCT No.: PCT/KR2018/011799
§ 371 (c)(1),
(2) Date: Apr. 10, 2020

(87) PCT Pub. No.: WO2019/074247
PCT Pub. Date: Apr. 18, 2019

(65) Prior Publication Data
US 2020/0243812 A1    Jul. 30, 2020

(30) Foreign Application Priority Data

Oct. 11, 2017 (KR) .................. 10-2017-0131670

(51) Int. Cl.
*H01M 10/20* (2006.01)
*H01M 50/213* (2021.01)
(Continued)

(52) U.S. Cl.
CPC ........... *H01M 50/213* (2021.01); *H01M 4/02* (2013.01); *H01M 10/0486* (2013.01);
(Continued)

(58) Field of Classification Search
CPC ............. H01M 10/613; H01M 10/615; H01M 10/643; H01M 10/6554; H01M 10/6567;
(Continued)

(56) References Cited

U.S. PATENT DOCUMENTS

| 2010/0279159 A1 | 11/2010 | Meintschel et al. |
| 2012/0263988 A1 | 10/2012 | Obasih et al. |

(Continued)

FOREIGN PATENT DOCUMENTS

| CN | 105098287 A | 11/2015 |
| CN | 105529507 A | 4/2016 |

(Continued)

OTHER PUBLICATIONS

International Search Report issued in corresponding International Patent Application No. PCT/KR2018/011799 dated Jan. 15, 2019.

(Continued)

*Primary Examiner* — Raymond Alejandro
(74) *Attorney, Agent, or Firm* — Morgan, Lewis & Bockius LLP

(57) ABSTRACT

A battery pack including a left battery module including a plurality of cells; a left heat transfer frame adjacent to a right side of the left battery module; a cooling member adjacent to the left heat transfer frame; a right heat transfer frame adjacent to a right side of the cooling member; a right battery module including a plurality of cells disposed adjacent to a right side of the right heat transfer frame; a lower plate and an upper cover respective disposed below and above the left battery module, the left heat transfer frame, the cooling member, the right heat transfer frame, and the right battery module; and wherein the upper cover comprises an over-pressing prevention protrusion disposed at a position corresponding to each of the left heat transfer frame, the cooling member, and the right heat transfer frame.

5 Claims, 2 Drawing Sheets

(51) Int. Cl.
  *H01M 10/613* (2014.01)
  *H01M 10/615* (2014.01)
  *H01M 10/643* (2014.01)
  *H01M 10/6554* (2014.01)
  *H01M 10/6567* (2014.01)
  *H01M 4/02* (2006.01)
  *H01M 10/04* (2006.01)
  *H01M 50/147* (2021.01)

(52) U.S. Cl.
  CPC ....... *H01M 10/613* (2015.04); *H01M 10/615* (2015.04); *H01M 10/643* (2015.04); *H01M 10/6554* (2015.04); *H01M 10/6567* (2015.04); *H01M 50/147* (2021.01); *H01M 2004/027* (2013.01); *H01M 2004/028* (2013.01)

(58) Field of Classification Search
  CPC .. H01M 10/0486; H01M 4/02; H01M 50/213; H01M 50/147; H01M 2004/027; H01M 2004/028
  See application file for complete search history.

(56) References Cited

U.S. PATENT DOCUMENTS

| | | | |
|---|---|---|---|
| 2013/0011713 A1 | 1/2013 | Harada et al. | |
| 2014/0322582 A1* | 10/2014 | Ruter | H01M 50/20 429/120 |
| 2015/0244036 A1 | 8/2015 | Lane et al. | |
| 2016/0013526 A1 | 1/2016 | Uchiyama et al. | |
| 2017/0279169 A1 | 9/2017 | Obrist et al. | |
| 2017/0288285 A1 | 10/2017 | Buckhout et al. | |
| 2017/0288286 A1* | 10/2017 | Buckhout | H01M 10/6556 |

FOREIGN PATENT DOCUMENTS

| | | |
|---|---|---|
| CN | 107181020 A | 9/2017 |
| EP | 2945219 A1 | 11/2015 |
| JP | 2010-519713 A | 6/2010 |
| JP | 2013-016351 A | 1/2013 |
| JP | 2013-30384 A | 2/2013 |
| JP | 2013-243079 A | 12/2013 |
| JP | 2016-21280 A | 2/2016 |
| KR | 10-2007-0117334 A | 12/2007 |
| KR | 10-2016-0111457 A | 9/2016 |
| KR | 10-2017-0022460 A | 3/2017 |
| KR | 10-2017-0057430 A | 5/2017 |
| WO | 2017/003504 A | 1/2017 |

OTHER PUBLICATIONS

Extended European Search Report dated May 8, 2020, issued in corresponding European Patent Application No. 18866505.3. Note: US 2014/0322582 cited therein is already of record.

First Notification of Office Action dated Jan. 25, 2020, issued in corresponding Japanese Patent Application No. 2020-504181.

First Notification of Office Action dated Aug. 11, 2022, issued in corresponding Chinese Patent Application No. 201880053625.0.

* cited by examiner

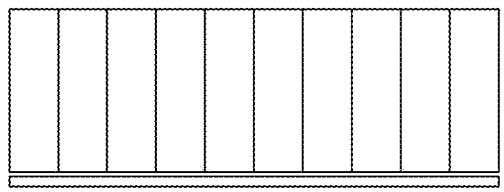
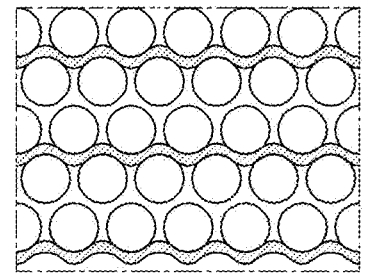
[Fig. 1A – Related Art]   [Fig. 1B – Related Art]
[Fig. 2]
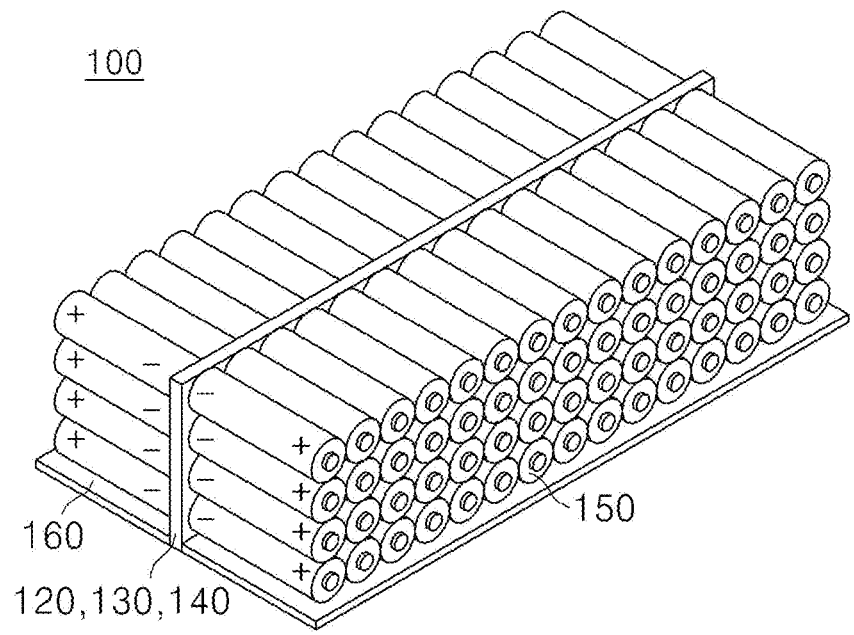

[Fig. 3]
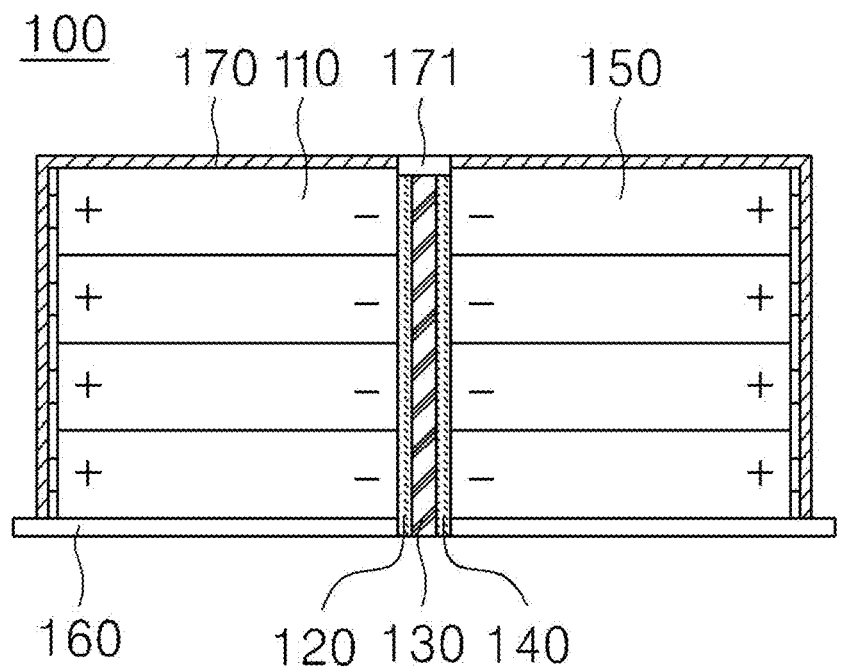
[Fig. 4]
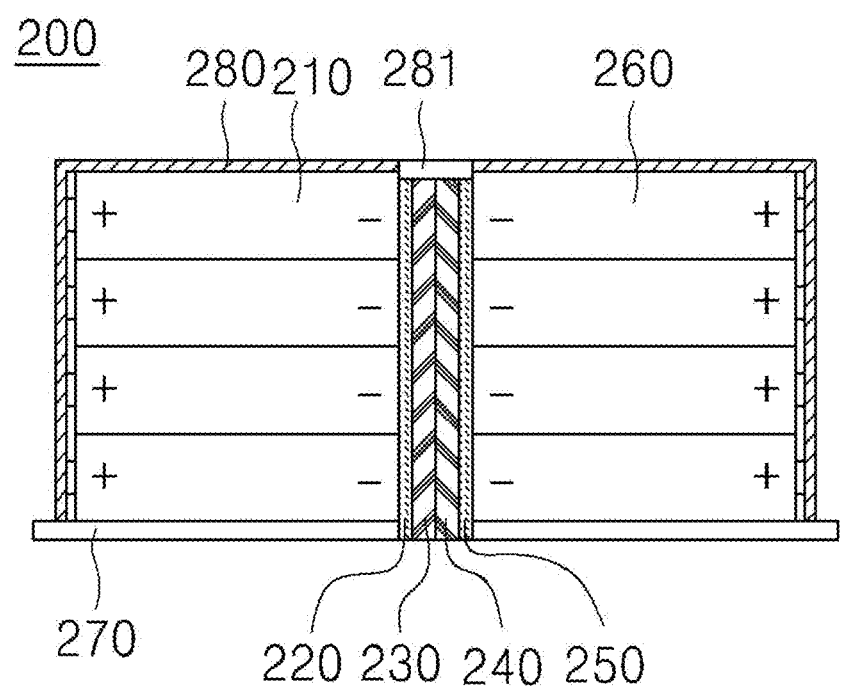

BATTERY PACK HAVING BIDIRECTIONAL COOLING STRUCTURE

TECHNICAL FIELD

The present disclosure relates to a battery pack having a bidirectional cooling structure, and more particularly, to a battery pack having a bidirectional cooling structure, which uniformly supplies or discharges heat to/from battery modules that are disposed to overlap each other.

BACKGROUND ART

A lithium secondary battery that is a unit cell constituting a battery pack has flexibility and also has a relatively free shape, is lightweight, and has excellent safety, and thus, demand for portable electronic devices such as mobile phones, camcorders, and notebook computers is increasing.

Also, the battery pack is classified in shape according to a shape of a battery case. When the electrode assembly is built in a cylindrical or prismatic metal can, the battery pack is classified as a cylindrical battery pack or a prismatic battery pack. When the electrode assembly is built in a pouch type case provided as an aluminum lamination sheet, the battery pack is classified as a pouch type battery pack.

Also, the electrode assembly built in the battery case includes a positive electrode, a negative electrode, and a separator interposed between the positive electrode and the negative electrode. Thus, the electrode assembly may be chargeable and dischargeable. The cylindrical electrode assembly may be provided in a jelly-roll type in which a positive electrode, a separator, and a negative electrode, each of which has a long sheet shape coated with an electrode active material, are sequentially laminated to be wound.

In general, when the battery pack is used for a long time, heat may be generated in the battery pack. Particularly, the stacked large capacity battery pack is accompanied by more heat as an amount of current increases during charging or discharging. Here, if the heat generated is not sufficiently dissipated, performance of the battery pack may be deteriorated or, moreover, be ignited or exploded.

To solve the above limitation, the battery pack includes a cooling member. The battery pack including the cooling member will be described in detail with reference to FIGS. 1A and 1B.

FIG. 1 is a view FIGS. 1A and 1B are views illustrating a structure of a battery pack in accordance with the related art.

FIG. 1A is a view illustrating a structure of a battery pack in which positive (+) electrodes of a plurality of cylindrical battery cells are disposed at an upper side, negative (−) electrodes are disposed at a lower side, and a cooling member is disposed at the lower side at which the negative (−) electrodes of the battery cells are disposed in accordance with the related art.

Also, FIG. 1B is a view illustrating a structure in which a cooling member is disposed on a side surface in each of two rows of the plurality of cylindrical battery cells in accordance with the related art.

In the structure of the battery pack of FIG. 1A, since the battery cell is disposed only at the upper side, a cooling effect of a surface that does not contact the battery cell may be deteriorated.

Also, in the structure of the battery pack of FIG. 1B, as a plurality of cooling members are provided, an inner space of the battery pack may be reduced to increase in cost due to the cooling members. In addition, when the circular cells are driven, as a negative (−) electrode of each of the cells may generate more heat than a side surface of the cell, efficiency of the structure cooling the side surface may be deteriorated.

Thus, there is a need for a method that is capable of reducing the cost due to the plurality of cooling members to increase in cooling effect of the battery cell.

PRIOR ART DOCUMENT

Patent Document (Patent Document 1) KR2017-0022460 A

DISCLOSURE OF THE INVENTION

Technical Problem

The present disclosure provides a battery pack having a bidirectional cooling structure, which reduces heat generated from battery cells when the plurality of battery cells are driven and is provided with the minimum number of cooling members to increase in efficiency of the cooling members.

Technical Solution

In accordance with an exemplary embodiment, a battery pack having a bidirectional cooling structure includes: a left battery module (110) which is constituted by a plurality of circular cells and in which the plurality of circular cells are continuously disposed in a width direction; a left heat transfer frame (120) disposed adjacent to a right side of the left battery module to transfer heat generated in the circular cells; a cooling member (130) disposed adjacent to the left heat transfer frame to cool the heat transferred from the left heat transfer frame; a right heat transfer frame (140) disposed adjacent to a right side of the cooling member to transfer the heat to the cooling member; and a right battery module (150) which is constituted by a plurality of circular cells disposed adjacent to a right side of the right heat transfer frame and in which the plurality of circular cells are continuously disposed in a width direction.

In the plurality of circular cells of the left battery module, positive (+) electrodes disposed at a left side and negative (−) electrodes disposed at a right side may be arranged in one direction.

In the plurality of circular cells of the right battery module, negative (−) electrodes disposed at a left side and positive (+) electrodes disposed at a right side may be arranged in one direction.

The battery pack may include: a lower plate disposed below the left battery module, the left heat transfer frame, the cooling member, the right heat transfer frame, and the right battery module; and an upper cover disposed above the left battery module, the left heat transfer frame, the cooling member, the right heat transfer frame, and the right battery module and coupled to the lower plate.

The upper cover may include an over-pressing prevention protrusion disposed at a position corresponding to each of the left heat transfer frame, the cooling member, and the right heat transfer frame.

In accordance with another exemplary embodiment, a battery pack having a bidirectional cooling structure includes: a first battery module in which a plurality of circular battery cells are continuously disposed in a width direction, and positive (+) electrodes and negative (−) electrodes are disposed in the same direction; a second battery module in which a plurality of circular battery cells are continuously disposed in a width direction, and positive (+) electrodes and negative (−) electrodes are disposed in the same direction; and a cooling module disposed between the first battery module and the second battery module to cool heat generated in the circular battery cells, wherein, in the first battery module and the second battery module, the negative (−) electrodes of the circular battery cells are disposed adjacent to each other to face each other.

The cooling module may be provided with a first heat transfer frame and a second heat transfer frame, which are respectively disposed adjacent to the first battery module and the second battery module, a cooling member configured to cool heat transferred from the first and second heat transfer frames may be disposed between the first heat transfer frame and the second heat transfer frame, and the first and second heat transfer frames may transfer heat generated in the battery cells to the cooling member.

The battery pack may include: a lower plate disposed below the first battery module, the second battery module, and the cooling module; and an upper cover disposed above the first battery module, the second battery module, and the cooling module and coupled to the lower plate.

The upper cover may include an over-pressing prevention protrusion disposed at a position corresponding to the cooling module.

The cooling member may be provided in the form of a plate and uses a liquid cooler or a metal cooler.

The cooling member may be made of a heat conductive material.

In the battery pack, a heating member may be additionally disposed at a left or right side of the cooling member.

The heating member may be provided in the form of a plate and uses a liquid heater or a metal heater.

The heating member may be made of a heat conductive material.

Advantageous Effects

In the battery pack in accordance with the exemplary embodiment, the battery modules constituted by the plurality of battery cells may be disposed on both sides, and the cooling member on which the heat transfer frames are disposed on both sides thereof may be disposed between the battery modules to quickly and uniformly cool the battery cells, thereby preventing the battery pack from being deteriorated in performance or exploded.

BRIEF DESCRIPTION OF THE DRAWINGS

FIGS. 1A and 1B are views illustrating a structure of a battery pack in accordance with the related art FIG. 2 is a perspective view of a battery pack in accordance with an exemplary embodiment;

FIG. 3 is a front cutaway view of the structure of the battery pack in accordance with an exemplary embodiment; and FIG. 4 is a view illustrating a structure of a battery pack in accordance with still another embodiment.

MODE FOR CARRYING OUT THE INVENTION

Hereinafter, embodiments of the present invention will be described in detail with reference to the accompanying drawings. However, the present invention is not limited to the embodiments below. Rather, these embodiments are provided so that this disclosure will be thorough and complete, and will fully convey the scope of the present invention to those skilled in the art.

Also, it will be understood that although the ordinal numbers such as first and second are used herein to describe various elements, these elements should not be limited by these numbers. The terms are only used to distinguish one component from other components. For example, a first element referred to as a first element in one embodiment can be referred to as a second element in another embodiment without departing from the scope of the appended claims. In the following description, the technical terms are used only for explaining a specific exemplary embodiment while not limiting the present invention. The terms of a singular form may include plural forms unless referred to the contrary.

While the term used in the present invention selects general terms that are widely used at present in consideration of the functions of the present invention, it is to be understood that this may vary depending on the intention or circumstance of those skilled in the art, the emergence of new technology, and the like. Also, in certain cases, there may be a term chosen arbitrarily by the applicant, and in this case, the meaning thereof will be described in detail in the description of the corresponding invention. Thus, the term used in the present invention should be defined based on the meaning of the term, not on the name of a simple term, but on the entire contents of the present invention.

Embodiment 1

Hereinafter, a battery pack in accordance with an exemplary embodiment will be described.

In a battery pack in accordance with an exemplary embodiment, a cooling member on which a heat transfer member is disposed to contact both sides thereof may be provided between battery modules constituted by a plurality of battery cells to effectively cool heat generated from the battery cells, thereby maintaining a constant temperature within the battery pack.

FIG. 2 is a perspective view of a battery pack in accordance with an exemplary embodiment.

Referring to FIG. 2, a battery pack 100 in accordance with an exemplary embodiment includes a left battery module 110 which is constituted by a plurality of circular cells and in which the plurality of circular cells are continuously disposed in a width direction, a left heat transfer frame 120 disposed adjacent to a right side of the left battery module 110 to transfer heat generated in the circular cells, a cooling member 130 disposed adjacent to the left heat transfer frame 120 to cool the heat transferred from the left heat transfer frame, a right heat transfer frame 140 disposed adjacent to a right side of the cooling member 130 to transfer the heat to the cooling member 130, and a right battery module 150 which is constituted by a plurality of circular cells disposed adjacent to a right side of the right heat transfer frame 140 and in which the plurality of circular cells are continuously disposed in a width direction.

A configuration of the battery pack 100 will be described below in more detail.

Also, each of the left battery module 110 and the right battery module 150 may include the plurality of circular cells. The plurality of circular cells are continuously disposed to be stacked in the width direction.

Also, the predetermined number of circular cells may be provided as one battery module and disposed in a separate case. Here, the separate case may be made of a material having high heat conductivity.

Also, in the plurality of circular cells of the left battery module 110, positive (+) electrodes disposed at the left side and negative (−) electrodes disposed at the right side are arranged in one direction. In the plurality of circular cells of the right battery module 150, negative (−) electrodes disposed at the left side and positive (+) electrodes disposed at the right side are arranged in one direction.

This is done because an amount of heat generated in the negative (−) electrodes of the battery cells is greater than that of heat generated in the positive (+) electrodes. Thus, the negative (−) electrodes of the battery cells are disposed in a direction in which the cooling member 130 is disposed so as to quickly reduce a temperature of the battery pack.

Also, the left heat transfer frame 120, the cooling member 130, and the right heat transfer frame 140 may be provided as one cooling module. This will be described in detail with reference to FIG. 3.

FIG. 3 is a side cutaway view illustrating a structure of the battery pack in accordance with an exemplary embodiment.

Referring to FIG. 3, the left heat transfer frame 120 is disposed adjacent to the right side of the left battery module 110, and the right heat transfer frame 140 is disposed adjacent to the left side of the right battery module 150.

Also, the left heat transfer frame 120 is disposed adjacent to the left side of the cooling member 130, and the right heat transfer frame 140 is disposed adjacent to the right side of the cooling member 130. Thus, the heat generated in the plurality of circular cells within the left battery module 110 and the right battery module 150 is transferred to the cooling member. When the cooling member 130 directly contacts the plurality of battery cells, the left heat transfer frame 120 and the right heat transfer frame 140 prevent the battery pack from being deteriorated in lifespan, stability, and driving performance due to freezing of the battery cells and prevent the cooling member 130 from being damaged by a plurality of factors.

Also, each of the left heat transfer frame 120 and the right heat transfer frame 140 may be provided in the form of a plate, of which one surface of a wide portion contacts the negative (−) electrodes of the plurality of battery cells, and the other surface contacts the cooling member 130. Thus, the plurality of battery cells may be cooled by one cooling module.

Also, each of the left heat transfer frame 120 and the right heat transfer frame 140 may be made of a material having high heat conductive characteristics. In according to an exemplary embodiment, each of the left heat transfer frame 120 and the right heat transfer frame 140 is made of an aluminum material, but is not limited thereto.

Also, the cooling member 130 is disposed adjacent to the left heat transfer frame 120 and the right heat transfer frame 140 to cool the heat transferred from the left heat transfer frame 120 and the right heat transfer frame 140.

Also, the cooling member 130 may be provided in the form of a plate. The cooling member 130 may use a liquid cooler or a metal cooler, and the outside of the cooling member 130 may be made of a heat conductive material so that the heat quickly enters from the outside.

Also, the cooling member 130 may be electrically connected to a BMS for controlling the battery pack. Thus, the cooling member 130 may be driven through the BMS when a temperature of the battery pack exceeds a predetermined temperature.

Also, the battery pack further includes a lower plate 160 disposed below the left battery module 110, the left heat transfer frame 120, the cooling member 130, the right heat transfer frame 140, and the right battery module 150 and an upper cover 170 disposed above the left battery module 110, the left heat transfer frame 120, the cooling member 130, the right heat transfer frame 140, and the right battery module 150 and coupled to the lower plate 160.

In more detail, the left heat transfer frame 120, the cooling member 130, and the right heat transfer frame 140 are disposed at a center of the lower plate 160 to perform the cooling of the battery pack. An over-pressing prevention protrusion 171 is disposed on the upper cover 170 at a position corresponding to each of the left heat transfer frame 120, the cooling member 130, and the right heat transfer frame 140.

The over-pressing prevention protrusion 171 may protect the cooling components 120, 130, and 140 from an external impact.

Embodiment 2

Hereinafter, a battery pack in accordance with another exemplary embodiment will be described.

In a battery pack in accordance with another exemplary embodiment, a cooling member and a heating member on which a heat transfer member is disposed to contact both sides may be provided between the battery modules constituted by a plurality of battery cells to cool heat generated from the battery cells or apply heat to the battery cell so as to constantly maintain the temperature of the battery pack in accordance with a temperature within the battery pack.

FIG. 4 is a view illustrating a structure of a battery pack in accordance with still another embodiment.

Referring to FIG. 4, a battery pack 200 in accordance with still another embodiment includes a first battery module 210 and a second battery module 260 in which a plurality of circular battery cells are continuously disposed in a width direction, and positive (+) electrodes and negative (−) electrodes are disposed in the same direction and temperature control modules 220 to 250 disposed between the first battery module 210 and the second battery module 260 to cool heat generated from the circular battery cells or apply heat to the circular battery cells. Here, in the first battery module 210 and the second battery module 260, the negative (−) electrodes of the circular battery cells are disposed adjacent to each other to face each other.

A configuration of the battery pack 200 will be described below in more detail.

Also, each of the first battery module 210 and the second battery module 260 may include the plurality of circular cells. The plurality of circular cells are continuously disposed to be stacked in the width direction.

Also, the predetermined number of circular cells may be provided as one battery module and disposed in a separate case. Here, the separate case may be made of a material having high heat conductivity.

Also, the electrodes of the cells of the first battery module 210 and the second battery module 260 may be arranged in the same one direction so that the entire battery cells are controlled to have a uniform temperature.

Also, the temperature control modules 220 to 250 include a first heat transfer frame 220 and a second heat transfer frame 250, which are respectively disposed adjacent to the first battery module 210 and the second battery module 260. A cooling member 230 for cooling heat transferred from the first and second transfer frames and a heating member 240 for applying heat to the first and second heat transfer frames are disposed between the first heat transfer frame 220 and the second heat transfer frame 250. The first and second heat transfer frames may transfer the heat generated in the battery cells to the cooling member 230 and also transfer the heat generated in the heating member 240 to the battery cells.

Also, when only the cooling is performed, only the cooling module for cooling the heat generated in the circular battery cells, but not the temperature control modules 220 to 250, may be disposed between the first battery module 210 and the second battery module 260.

The cooling module includes a first heat transfer frame and a second heat transfer frame, which are respectively disposed adjacent to the first battery module and the second battery module. A cooling member for cooling heat transferred from the first and second heat transfer frames may be provided between the first and second heat transfer frames, and the first and second heat transfer frames may transfer the heat generated in the battery cells to the cooling member.

In more details of the temperature control modules 220 to 250, a wide one surface of each of the first and second heat transfer frames 220 and 250 may be disposed adjacent to the first battery module 210 or the second battery module 260, and the other surface may be disposed adjacent to the cooling member 230 or the heating member 240. Thus, the plurality of battery cells may be cooled or heated by using one temperature control module.

Also, each of the first and second heat transfer frames 220 and 250 is provided in the form of a plate to contact negative (−) electrodes of the plurality of battery cells within the first battery module 210 or the second battery module 260.

Also, each of the first heat transfer frame 220 and the second heat transfer frame 250 may be made of a material having high heat conductive characteristics. In according to an exemplary embodiment, each of the first heat transfer frame 220 and the second heat transfer frame 250 is made of an aluminum material, but is not limited thereto.

Also, the cooling member 230 may be disposed adjacent to the first or the second heat transfer frame 220 or 250 to transfer the heat generated in the heating member 240 to the first or second heat transfer frame 220 or 250 or cool the heat transferred from the first or second heat transfer frames 220 or 250.

Also, the cooling member 230 may be provided in the form of a plate. The cooling member 230 may use a liquid cooler or a metal cooler, and the outside of the cooling member 230 may be made of a heat conductive material so that the heat quickly enters from or is transferred to the outside.

Also, the cooling member 230 may be electrically connected to a BMS for controlling the battery pack. Thus, the cooling member 230 may be driven through the BMS when a temperature of the battery pack exceeds a predetermined temperature.

Also, the heating member 240 may be disposed adjacent to a left or right side of the cooling member 230 to apply heat to the cooling member 230 and the first or second heat transfer frame 220 or 250 or transfer the heat transferred from the first or second heat transfer frame 220 or 250 to the cooling member 230.

Also, the heating member 240 may be provided in the form of a plate. The heating member 240 may use a liquid heater or a metal heater, and the outside of the heating member 240 may be made of a heat conductive material so that the heat is quickly discharged or transferred to the outside.

Also, the heating member 240 may be electrically connected to a BMS for controlling the battery pack. Thus, the heating member 240 may be driven through the BMS when a temperature of the battery pack is less than a predetermined temperature.

That is, when the cooling member 230 is driven, the heating member 240 may function as the heat transfer component. When the heating member 240 is driven, the cooling member 230 may function as the heat transfer component.

Also, the battery pack further includes a lower plate 270 disposed below the first battery module 210, the second battery module 260, and the temperature control modules 220 to 250 and an upper cover 280 disposed above the first battery module 210, the second battery module 260, and the temperature control modules 220 to 250 and coupled to the lower plate 270.

In more details, the temperature control modules 220 to 250 may be disposed at a center of the lower plate 270 to perform the cooling or heating according to a temperature of the battery pack. An over-pressing prevention protrusion 281 disposed at a position corresponding to each of the temperature control modules 220 to 250 disposed at the center of the lower plate 270 may be disposed on the upper cover 280.

The over-pressing prevention protrusion 281 may protect the temperature control modules 220 to 250 from an external impact.

As described above, the technical idea of the present invention has been specifically described with respect to the above embodiments, but it should be noted that the foregoing embodiments are provided only for illustration while not limiting the present invention. Various embodiments may be provided to allow those skilled in the art to understand the scope of the preset invention, but the present invention is not limited thereto.

DESCRIPTION OF SYMBOLS

100: Battery pack
110: Left battery module
120: Left heat transfer frame
130: Cooling member
140: Right heat transfer frame
150: Right battery module
160: Lower plate
170: Upper cover
171: Over-pressing prevention protrusion

The invention claimed is:

1. A battery pack comprising:
a left battery module including a plurality of circular cells and in which the plurality of circular cells are continuously disposed in a width direction;
a left heat transfer frame adjacent to a right side of the left battery module to transfer heat generated in the plurality of circular cells of the left battery module;
a cooling member adjacent to the left heat transfer frame to cool the heat transferred from the left heat transfer frame;
a right heat transfer frame adjacent to a right side of the cooling member to transfer the heat to the cooling member;
a right battery module including a plurality of circular cells disposed adjacent to a right side of the right heat transfer frame and in which the plurality of circular cells of the right battery module are continuously disposed in the width direction; and
a heating member disposed adjacent to a left or right side of the cooling member;
wherein the cooling member is driven when a temperature of the battery pack exceeds a predetermined first temperature and cools the heat transferred through the left and right heat transfer frames and the heating member from the plurality of circular cells of the left and right battery modules, and wherein the heating member is driven when a temperature of the battery pack is less than a predetermined second temperature, which is less than the predetermined first temperature, and transfers heat to the plurality of circular cells of the left and right battery modules through the left and right heat transfer frames and the cooling member.

2. The battery pack of claim 1, wherein, in the plurality of circular cells of the left battery module, positive (+) electrodes disposed at a left side and negative (−) electrodes disposed at a right side are arranged in one direction.

3. The battery pack of claim 1, wherein, in the plurality of circular cells of the right battery module, negative (−) electrodes disposed at a left side and positive (+) electrodes disposed at a right side are arranged in one direction.

4. The battery pack of claim 1, wherein the battery pack comprises:
   a lower plate disposed below the left battery module, the left heat transfer frame, the cooling member, the heating member, the right heat transfer frame, and the right battery module; and
   an upper cover disposed above the left battery module, the left heat transfer frame, the cooling member, the heating member, the right heat transfer frame, and the right battery module and coupled to the lower plate.

5. The battery pack of claim 4, wherein the upper cover comprises an over-pressing prevention protrusion protruding from a lower surface of the upper cover to be disposed in a space between the left and right battery modules and to be in contact with each of the left heat transfer frame, the cooling member, the heating member, and the right heat transfer frame.

* * * * *